United States Patent
Dillon

(10) Patent No.: US 7,336,679 B2
(45) Date of Patent: Feb. 26, 2008

(54) METHOD AND SYSTEM FOR PROVIDING DIFFERENTIATED QUALITY OF SERVICE DIVERSITY ALOHA

(75) Inventor: Douglas Dillon, Gaithersburg, MD (US)

(73) Assignee: Hughes Electronic Corporation, El Segundo, CA (US)

( * ) Notice: Subject to any disclaimer, the term of this patent is extended or adjusted under 35 U.S.C. 154(b) by 1157 days.

(21) Appl. No.: 10/138,135

(22) Filed: May 2, 2002

(65) Prior Publication Data
US 2003/0174663 A1 Sep. 18, 2003

(51) Int. Cl.
*H04B 7/212* (2006.01)
(52) U.S. Cl. .................. 370/442; 370/252; 375/299
(58) Field of Classification Search ............. 370/442, 370/443, 278, 336, 337, 315, 316, 347, 252; 455/12.1, 452; 714/786; 375/267, 299, 375/347
See application file for complete search history.

(56) References Cited

U.S. PATENT DOCUMENTS

| | | | | |
|---|---|---|---|---|
| 6,115,390 | A * | 9/2000 | Chuah | 370/443 |
| 6,961,539 | B2 * | 11/2005 | Schweinhart et al. | 455/12.1 |
| 2002/0051462 | A1* | 5/2002 | Ertel et al. | 370/442 |
| 2003/0032391 | A1* | 2/2003 | Schweinhart et al. | 455/12.1 |
| 2003/0096617 | A1* | 5/2003 | Miller, II et al. | 455/452 |

* cited by examiner

*Primary Examiner*—John Pezzlo
(74) *Attorney, Agent, or Firm*—Bell, Boyd & Lloyd

(57) ABSTRACT

An approach for providing access in a communications system is disclosed. A network node (or terminal) generates duplicate bursts. The network node then transmits the duplicate bursts over a contention channel according to a predetermined quality-of-service (QoS) designation. The contention channel can be established based on a diversity ALOHA protocol. The present invention has particular applicability to a radio communications system, such as a satellite network that provides data communication services.

70 Claims, 10 Drawing Sheets

METHOD AND SYSTEM FOR PROVIDING DIFFERENTIATED QUALITY OF SERVICE DIVERSITY ALOHA

FIELD OF THE INVENTION

The present invention relates to a communications system, and is more particularly related to multiple access communications systems.

BACKGROUND OF THE INVENTION

Wireless communications systems (e.g., satellite networks) provide a pervasive and reliable infrastructure to distribute voice, data, and video signals for global exchange and broadcast of information. These communications systems have emerged as a viable option to terrestrial communications systems. Unlike terrestrial networks, such systems are more susceptible to service disruptions stemming from changing channel conditions, such as fading because of weather disturbances. Additionally, such systems cannot readily increase capacity, and thus, rely on various techniques to enhance spectral efficiency. Further, because of the diversity of communications needs of subscribers, subscribers demand that these wireless communications systems provide assurances with respect to availability, reliability, and throughput in a cost-effective manner. If a service provider supplies a uniform level of service, then more demanding subscribers would not be satisfied for a "standard" service guarantee, even though such subscribers are willing to pay a greater premium for better service; under this scenario, the service provider is foregoing revenue. However, if the uniform level of service is greater than what the less demanding subscribers seek, then these subscribers are essentially "overpaying" for the level of service, as they may be willing to pay less for fewer guarantees regarding network performance.

Wireless communications systems often employ multiple terminals to share a resource of spectrum; such a system is referred to as a multiple access system. Many methods of providing multiple access are deployed in existing communications systems; such as a Frequency Division Multiple Access (FDMA) system, and a Time Division Multiple Access (TDMA). With FDMA, a band of spectrum is supplied to each terminal based on frequency assignments, thereby allowing the terminals to share the spectrum. The TDMA scheme permits sharing the spectrum based on time; that is, when a terminal allowed to transmit.

Many different methods have been employed to allow terminals to perform multiple access in TDMA and FDMA/TDMA systems. These multiple access policies are typically evaluated in terms of their efficiency and their latency characteristics. Often, as the efficiency increases, the latency characteristics degrade. Efficiency, in this context, means the total number of usable bits carried divided by the total of each channel's information rate. An important example of a latency characteristic is the percentage of transmissions which are successfully delivered in less than a specific threshold latency, for example, 1200 msec One multiple access scheme is referred to as Slotted ALOHA, which is conventionally used in a satellite system. With slotted ALOHA, the channels in a FDMA/TDMA system or the single channel in a TDMA system is divided into fixed size timeslots, referred to as ALOHA slots. When a terminal in the satellite system has data to transmit, the terminal selects an ALOHA slot at random and transmits the data within the ALOHA slot. The transmission within a slot is referred to as a burst. Frequently, when the system is lightly loaded, the terminal selects a slot that is not used by another terminal in which case the burst is considered successful. The term "collision" refers to the event in which two or more terminals attempt to transmit in the same selected slot. These transmissions interfere with each other, and in most cases none of the bursts transmitted in the slot are successfully delivered. When a terminal detects that its burst has failed, which typically occurs because of a collision, the terminal randomly picks another slot and retransmits. Provided the system is not overloaded, the terminal should within a small number of tries have its transmission succeed.

Based on the foregoing, there is a need for a radio communications system that provides a quality-of-service (QoS) mechanism in a shared medium using a multiple access scheme. There is also a need to enhance spectral efficiency. There is a further need to provide cost-effective network services to subscribers that are tailored to the subscribers' needs. Therefore, an approach for supporting differentiated network services is highly desirable.

SUMMARY OF THE INVENTION

These and other needs are addressed by the present invention, wherein an approach is provided for performing a contention scheme that supports differentiated quality of service levels. Under one embodiment of the present invention, terminals communicate according to a diversity ALOHA protocol, in which quality of service levels correspond to the amount of diversity. In an exemplary embodiment, a communications system with two-levels of service (e.g., basic and premium) can specify that the basic terminals operate with a diversity of two slots (i.e., transmitting each portion of data in two different, duplicate bursts), while the premium service can specify a diversity of four slots (i.e., transmitting each portion of data in three different, duplicate bursts). Additionally, in an exemplary embodiment, the contention channel is established according to a Frequency Division Multiple Access (FDMA)/Time Division Multiple Access (TDMA) scheme for providing communication in a satellite communications system. The above arrangement advantageously provides a mechanism to support Quality-of-Service (QoS) services over a contention channel.

According to one aspect of the present invention, a method for providing access in a communications system is disclosed. The method includes generating a plurality of bursts, wherein one of the bursts is a duplicate of another one of the bursts. The method also includes transmitting the duplicate bursts over a contention channel according to a pre-determined quality-of-service (QoS) designation.

According to another aspect of the present invention, a network device for providing access in a communications system is disclosed. The network device includes logic configured to determine a service level associated with transmission of a burst. The network device also includes a transceiver configured to transmit multiple copies of the burst over a contention channel according to the service level.

According to another aspect of the present invention, a system for providing access in a communications system is disclosed. The system includes means for generating a plurality of bursts, wherein one of the bursts is a duplicate of another one of the bursts. The system also includes means for transmitting the duplicate bursts over a contention channel according to a pre-determined quality-of-service (QoS) designation.

According to another aspect of the present invention, a computer-readable medium carrying one or more sequences of one or more instructions for providing access in a communications system is disclosed. When executed by one or more processors, the instructions cause the one or more processors to perform the step of generating a plurality of bursts, wherein one of the bursts is a duplicate of another one of the bursts. Another step includes transmitting the duplicate bursts over a contention channel according to a pre-determined quality-of-service (QoS) designation.

According to another aspect of the present invention, a method for providing access to a contention channel for a plurality of terminals in a communications system is disclosed. The method includes specifying a plurality of service levels for the plurality of terminals. The method also includes executing a communication protocol to provide the contention channel, wherein one of the plurality of terminals concurrently transmits a plurality of bursts according to the corresponding service level, and one of the bursts is a duplicate of another one of the bursts.

According to another aspect of the present invention, a computer-readable medium carrying one or more sequences of one or more instructions for providing access to a contention channel for a plurality of terminals in a communications system is disclosed. When executed by one or more processors, the instructions cause the one or more processors to perform the steps of specifying a plurality of service levels for the plurality of terminals, and executing a communication protocol to provide the contention channel. One of the plurality of terminals transmits a plurality of bursts according to the corresponding service level, and one of the bursts is a duplicate of another one of the bursts.

According to another aspect of the present invention, a method for communicating over a shared medium is disclosed. The method includes receiving one or more bursts over a contention channel of the shared medium from a terminal, wherein the bursts are duplicates, the quantity of bursts being dependent on a pre-determined quality-of-service (QoS) designation associated with the terminal. The method also includes selectively discarding all but one of the bursts.

According to another aspect of the present invention, a computer-readable medium carrying one or more sequences of one or more instructions for communicating over a shared medium is disclosed. When executed by one or more processors, the instructions cause the one or more processors to perform the step of receiving one or more bursts over a contention channel of the shared medium from a terminal, wherein the bursts are duplicates. The quantity of bursts is dependent on a pre-determined quality-of-service (QoS) designation associated with the terminal. Another step includes selectively discarding all but one of the bursts.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, device, and software for supporting multiple quality of service levels over a contention channel are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although embodiments of the present invention are explained with respect to a satellite communications system, it is recognized that the present invention can be practiced in any type of communications system that utilizes multiple access protocols, such as slotted ALOHA. For example, slotted ALOHA can be used in terrestrial communications systems; for example, TDMA digital cellular systems to carry signaling traffic from the cell phones to the cellular base stations.

Figure 1:
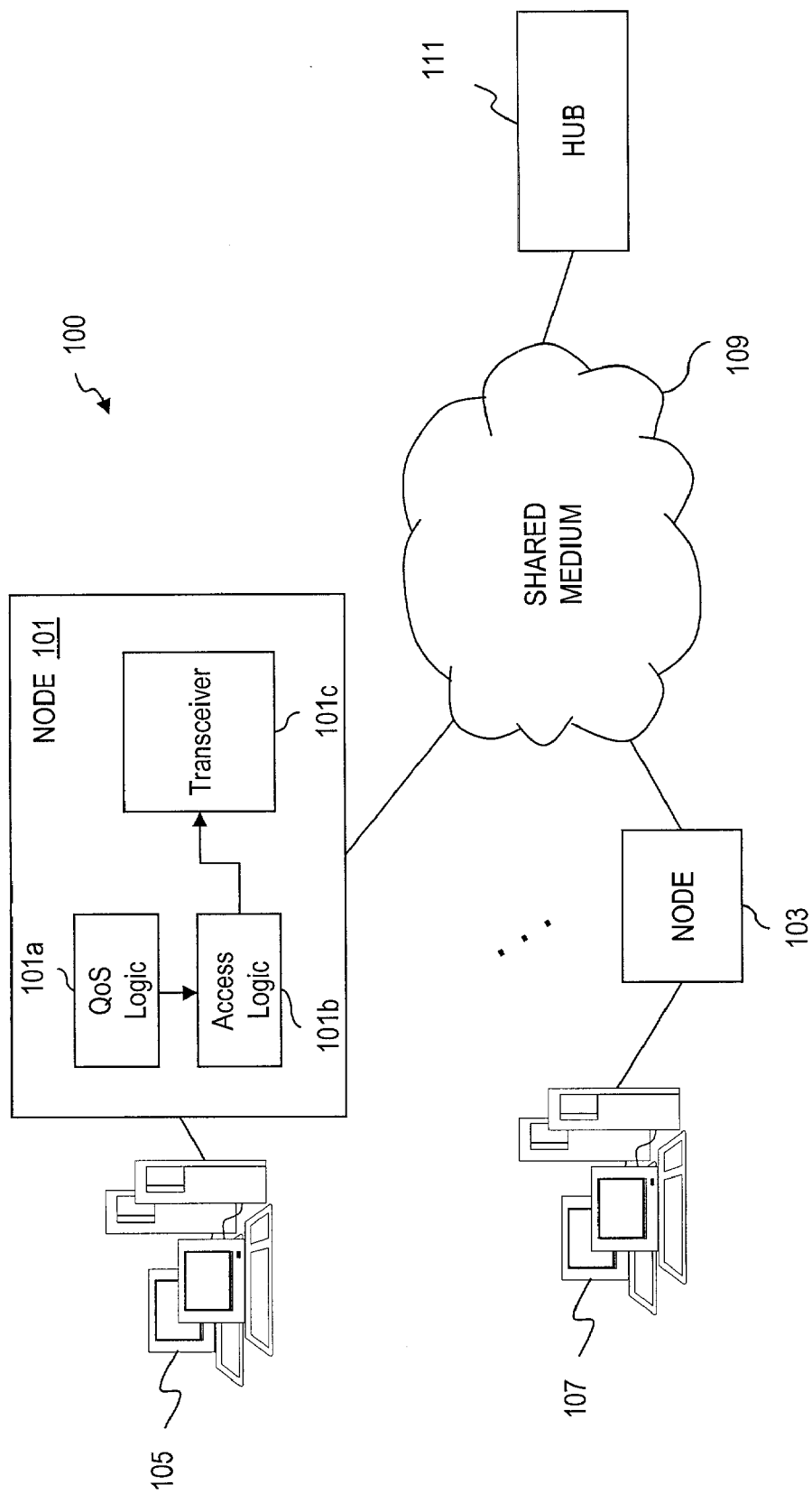
FIG. 1 is a diagram of a communications system capable of utilizing a multiple access scheme, according to an embodiment of the present invention.

FIG. 1 is a diagram of a communications system capable of utilizing a multiple access scheme, according to an embodiment of the present invention. A communications system 100 includes one or more network nodes 101, 103 that provide access for connected hosts 105, 107, respectively, to a shared medium 109. The share medium 109 can be any type of data network that supports multiple access communications protocols (e.g., slotted ALOHA, diversity ALOHA, etc.). Also, attached to the shared medium 109 is a hub node 111 that can be responsible for establishing and managing the contention channels with the shared medium 109.

As shown, the node 101 has a Quality-of-Service (QoS) logic 101a for determining the designated quality of service level (e.g., premium service or basic service) for the particular node 101. An access logic 101b determines and sets the necessary parameters associated with a multiple access protocol to implement and maintain the determined quality of service level. For example, in the case of a diversity ALOHA protocol, the access logic 101b can specify use of a larger amount of time-slots (e.g., 4 or 3) for the premium service compared with that of the basic service (e.g., 2 slots, or even 1 slot). A transceiver 101c can transmit the bursts over the shared medium. It is noted that the node 103 can also be equipped with QoS logic and access logic, similar to that of the network node 101. Although the logic 101a, 101b are shown as separate components, it is recognized that the functionalities of these logic 101a, 101b can be combined as a single component. Further, the logic 101a, 101b can be implemented in hardware and/or software.

Figure 2:
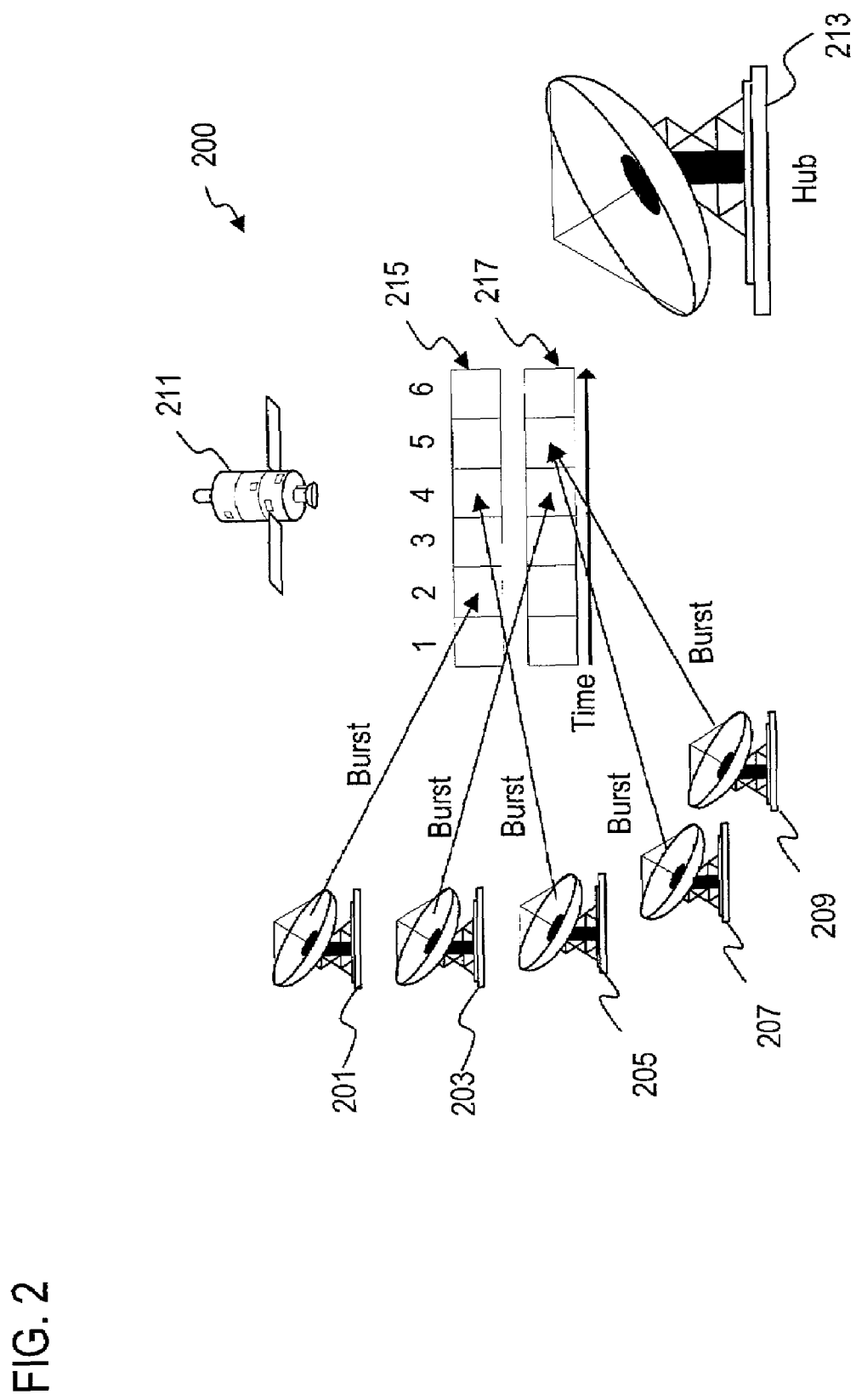
FIG. 2 is a diagram of a satellite communications system capable of providing a Quality-of-Service (QoS) mechanism over a contention channel, according to an embodiment of the present invention.

The system 100, according to one embodiment of the present invention, can be deployed as a satellite communications system, as described with respect to FIG. 2.

FIG. 2 is a diagram of a satellite communications system capable of providing a Quality-of-Service (QoS) mechanism over a contention channel, according to an embodiment of the present invention. Under this scenario, a radio communication system 200 supports multiple network nodes (i.e., terminals) 201, 203, 205, 207, 209, which can communicate with each of the terminals as well as a hub station 213 via a geosynchronous satellite 211. The terminals 201, 203, 205, 207, 209 are Very Small Aperture Terminals (VSATs) capable of supplying data communication services for connected hosts (not shown). Slotted ALOHA has been employed in many different communications system including satellite communications systems. It is often used in Very Small Aperture Terminal (VSAT) satellite communications systems. A VSAT system typically has approximately an 800 ms round-trip delay. Slotted ALOHA provides, when properly tuned, a relatively short response time in that a transmission may begin immediately without waiting for a request for bandwidth to be sent to the hub station. Slotted ALOHA is used both to actually carry traffic from the VSAT to the hub and also to carry an initial bandwidth request of more complicated multiple access policies such as reservation policies.

In an exemplary embodiment, the system 200 utilizes an access scheme that combines both FDMA and TDMA. In such an FDMA/TDMA system 200, the spectrum is first divided by frequency into several channels 215, 217; the system 200 then employs TDMA to share the individual channels 215, 217 in form of time slots among the terminals 201, 203, 205, 207, 209. By way of example, two contention channels 215, 217 are shown, providing FDMA/TDMA slotted ALOHA multiple access.

The satellite 211 relays the spectrum from multiple FDMA channels 215, 217 received from anywhere under the "foot print" of the satellite 211 on a different frequency back to back to earth anywhere under the satellite's foot print. The hub station 213 is thus configured to receive the FDMA channels 215, 217. According to an embodiment of the present invention, the FDMA channels 215, 217 are organized in time into fixed length ALOHA slots. When a terminal 201, 203, 205, 207, 209 has data to transmit, the terminal 201, 203, 205, 207, 209 selects a slot at random and transmits a burst containing the data into the selected slot. When multiple terminals 201, 203, 205, 207, 209 select an identical time slot, as is the case with the terminals 207, 209 into the channel 217 on slot 5, a collision occurs, thereby requiring the terminals 207, 209 to retry (i.e., attempt another transmission).

Diversity ALOHA provides an enhancement to slotted ALOHA. With diversity ALOHA, when a terminal needs to transmit, the terminal select not a single slot, but multiple slots at random in which to transmit. The transmission is considered successful when any of the transmissions succeed. The use of Diversity ALOHA increases, compared to slotted ALOHA, the maximum efficiency achievable for a given latency threshold.

A number schemes within the general family of slotted ALOHA multiple access exists whereby a terminal may determine whether one of its bursts was successful. In some cases, the system provides an indication to the terminals of the status of each of the ALOHA slots. That status indicates whether the slot contained a successful burst. A terminal can determine whether one of its bursts has been transmitted successful by checking the status of that burst's slot. In other cases an automatic repeat request (ARQ) protocol is used and a terminal retransmits a burst if a timeout expires without an acknowledgement for the burst being received or retransmits after a negative acknowledgement for the burst is received.

With diversity ALOHA, however, it is recognized that there is a higher probability that the same data will be delivered more than once. Additionally, a high probability exists that data will be delivered out of sequence; in other words, the order of the data that is received differs from the order that the data was originally intended to be delivered. As a result, the data sent in a burst provides information that identifies the burst's data in such a way that the receiver of those bursts may discard duplicate transmissions. This information, in an exemplary embodiment, can be the source address of the transmitter and a sequence number. The use of a source address and sequence number allows a receiver to not only eliminate duplicate transmissions, but also return out-of-sequence data back to their original intended order.

Because the system 200 can support QoS services, a service provider of the system 200 can increase total revenue by charging more for a "premium" quality of service. By contrast, the conventional use of slotted ALOHA and diversity ALOHA has the drawback that a uniform quality of service in terms of latency experienced is given to the terminals in the system. With conventional slotted ALOHA and diversity ALOHA system, support for QoS services can be implemented by dedicating a subset of the slots to the terminals associated with premium users in such a way that those slots were managed to have lower utilization (and thus offer better latency characteristics). Unfortunately, the management of these subsets of slots is very difficult, and therefore, error prone, especially when the number and mix of users vary. This approach suffers from another drawback in that it is inefficient, particularly when the fraction of "premium" terminal is small.

Figure 3A:
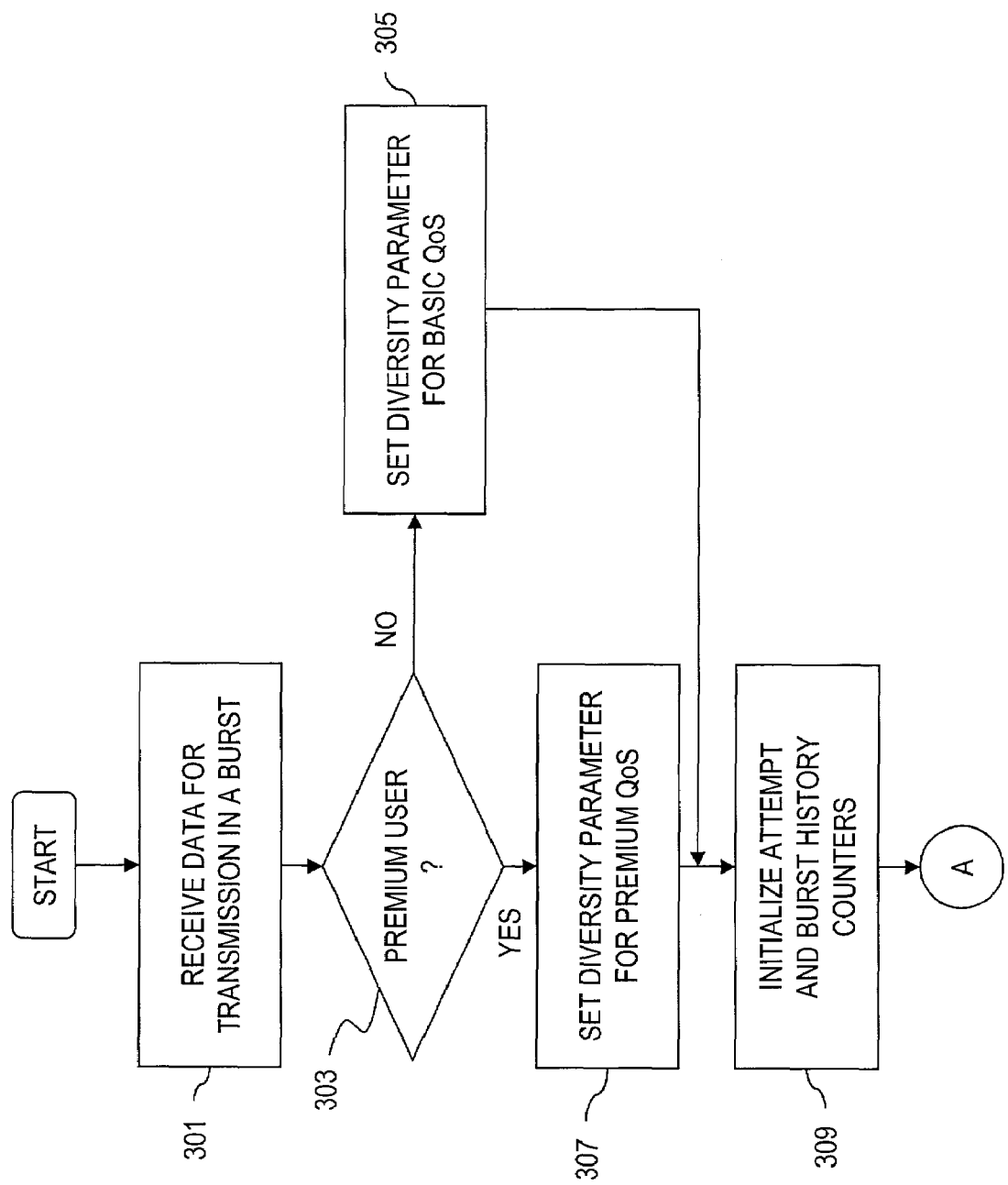
FIGS. 3A-3C are flowcharts of a process for supporting QoS services in the system of FIG. 2.
Figure 3B:
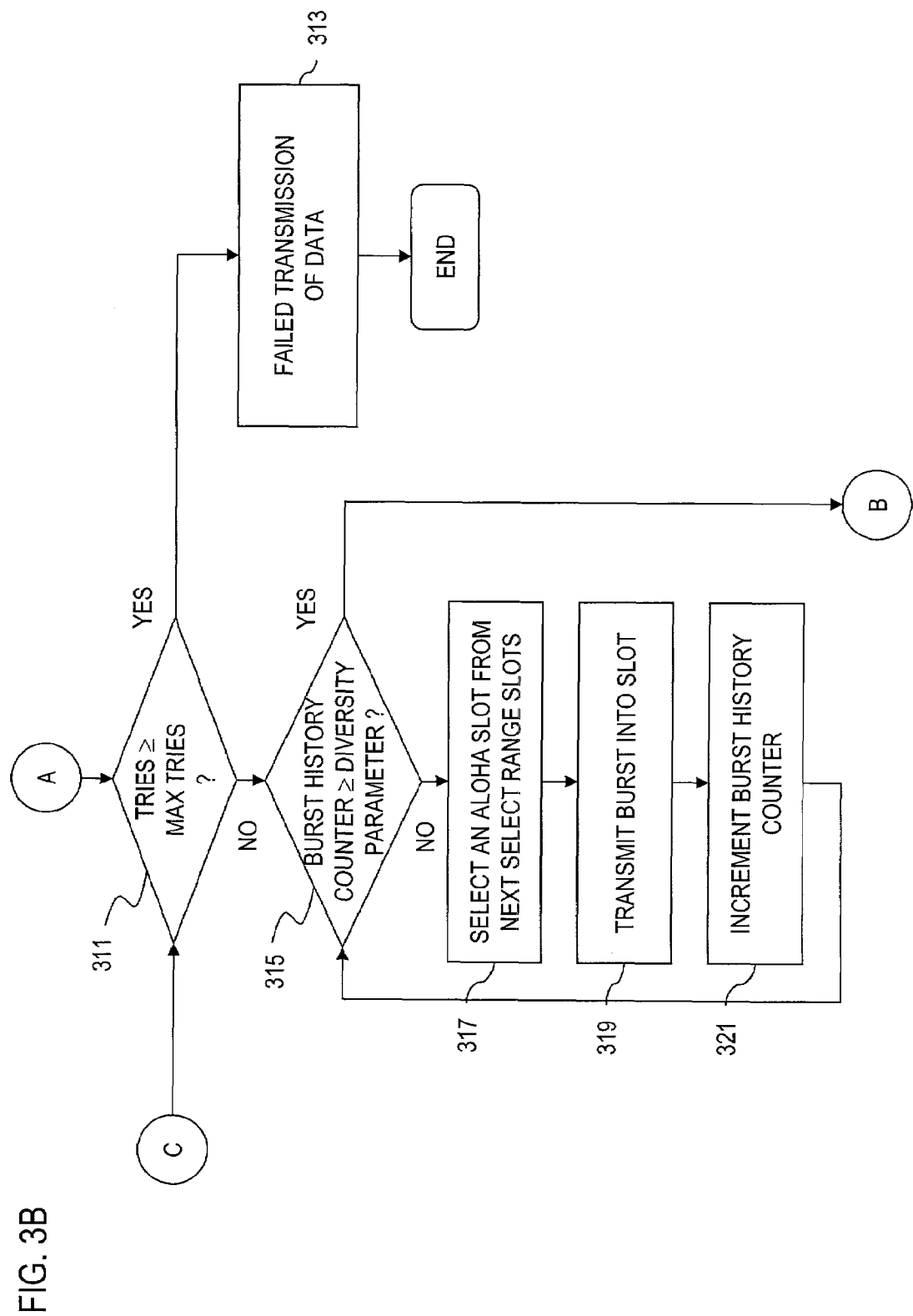
Figure 3C:
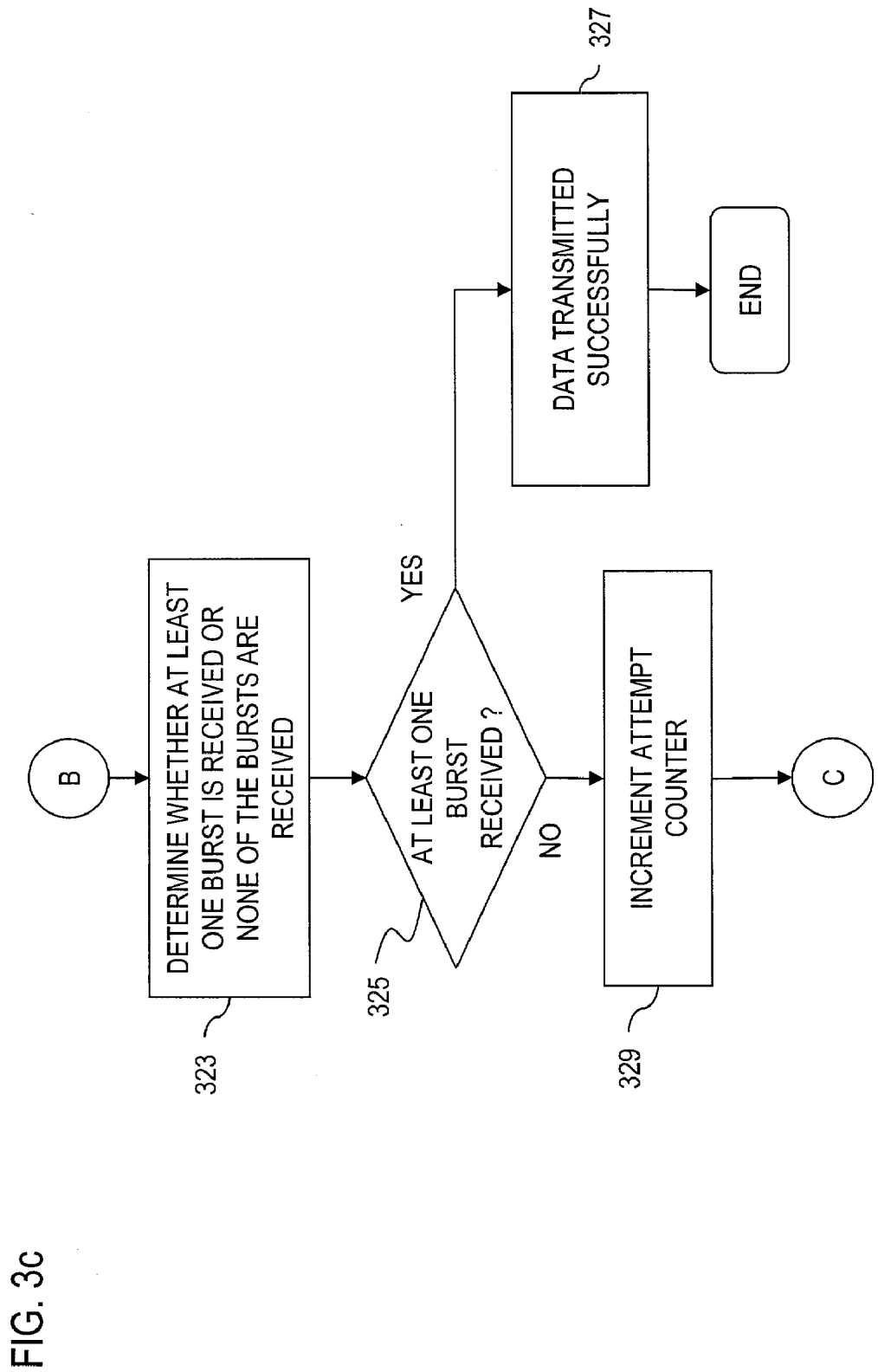

FIGS. 3A-3C are flowcharts of a process for supporting QoS services in the system of FIG. 2. This process represents one embodiment of the present invention; it is noted that various embodiments exists such that different quality of service levels (i.e., two or more levels) are supported over other types of networks. For the purposes of explanation, the process for supplying different quality service levels is described for two service levels (e.g., premium and basic) within the system 100 employing diversity ALOHA. That is, the diversity of the terminal's transmission is a function of its service quality level. It is understood, according to various embodiments of the present invention, that any number of service levels can be implemented, such that the diversity increases with higher quality of service. In step 301, the node 101 receives data from one of the hosts 105; the data is prepared for transmission within one or more bursts over a contention channel within the shared medium 109. The QoS logic 101a determines, as in step 303, whether this packet for this node 101 is associated with a premium service; if not, the diversity parameter is set to effect a basic quality of service (e.g., 1 or 2 slots), per step 305. Different categories of traffic carried by a single node may be carried by different quality of service levels. If the service level of the node 101 is premium, then, per step 307, the diversity parameters are appropriately set (e.g., 2-4 slots).

Prior to transmission, the node 101 initializes an Attempt counter and a Burst History counter, per step 309. The Attempt counter tracks the number of transmission attempts (i.e., "TRIES"). The Burst History counter reflects the number of duplicate burst transmissions by the node 101 for the subject burst, such that the node 101 continues to transmit duplicate bursts until the proper diversity parameter is satisfied.

Next, as shown in FIG. 3B, in step 311, the number of attempts (TRIES), as captured by the Attempt counter, is compared with a predetermined maximum value (i.e., "MAX TRIES"). If the value of TRIES meets or exceeds the threshold, MAX TRIES, then an unsuccessful transmission of the data is declared (per step 313). If, however, the number of attempts is less than the threshold, MAX TRIES, then the QoS logic 101a checks, as in step 315, whether the Burst History counter value is greater than or equal to the diversity parameter (as set per step 305 or step 307). If the Burst History counter value is less than the diversity parameter, then the node 101 selects an ALOHA slot from the next select range slots, per step 317. In step 319, the node 101 transmits the burst into the selected slot, and the Burst History counter is incremented (per step 321). Thereafter, step 315 is repeated until the value of the Burst History counter is greater than the diversity parameter, thereby ensuring that the designated quality of service level corresponds to the diversity.

In step 323, the source node 101 determines whether anyone of the duplicate bursts is received by the destination node (e.g., node 103), as shown in FIG. 3C. If at least one of the duplicate bursts is received (as determined by step 325), then the data transmission is deemed successful (per step 327). However, if no burst is received, then a collision is assumed, and the Attempt counter is incremented, as in step 329; thereafter, step 311 is repeated.

According to one embodiment of the present invention, each different block of data to be transmitted in a burst is sent along with data uniquely identifying the data. This identifier information can be sent unchanged along with the data in each burst of each try (or retry) of the data. In an exemplary embodiment, the identifier information can include the identification (ID) of the node (or terminal). Consequently, this allows the receiving node 103 (i.e., receiver) to detect and discard duplicate transmissions of the data.

Further, each different block of data can also transmitted, in an exemplary embodiment, along with data uniquely identifying the order that the data should be delivered (i.e., sequence information). The sequence information specifies the ordering of the data, thereby permitting the receiver to organize the received data back in its original order. This sequence information, in an exemplary embodiment, can include a modulo N sequence number, where N is of sufficient size to provide unique sequence numbers for a given series of burst transmissions. In other words, N is set such that the receiving node need ever handle different data with the same sequence number.

The above two mechanisms thus permit the receiver (e.g., the destination node 103) to reassemble a terminal's data and deliver it in order without duplicates. Further, for the source node 101 can determine whether its bursts were successfully received by the information that is sent back from the receiver. For example, the receiver can send back the identifier information and sequence information to indicate that the bursts have been successfully received. Alternatively, the receiver can simply acknowledge the transmission by sending back the highest sequence number from each terminal which had a burst successfully received. Further, the receiver can send back, for each ALOHA slot, an indication of whether a burst was successfully received in the slot.

Figure 4:
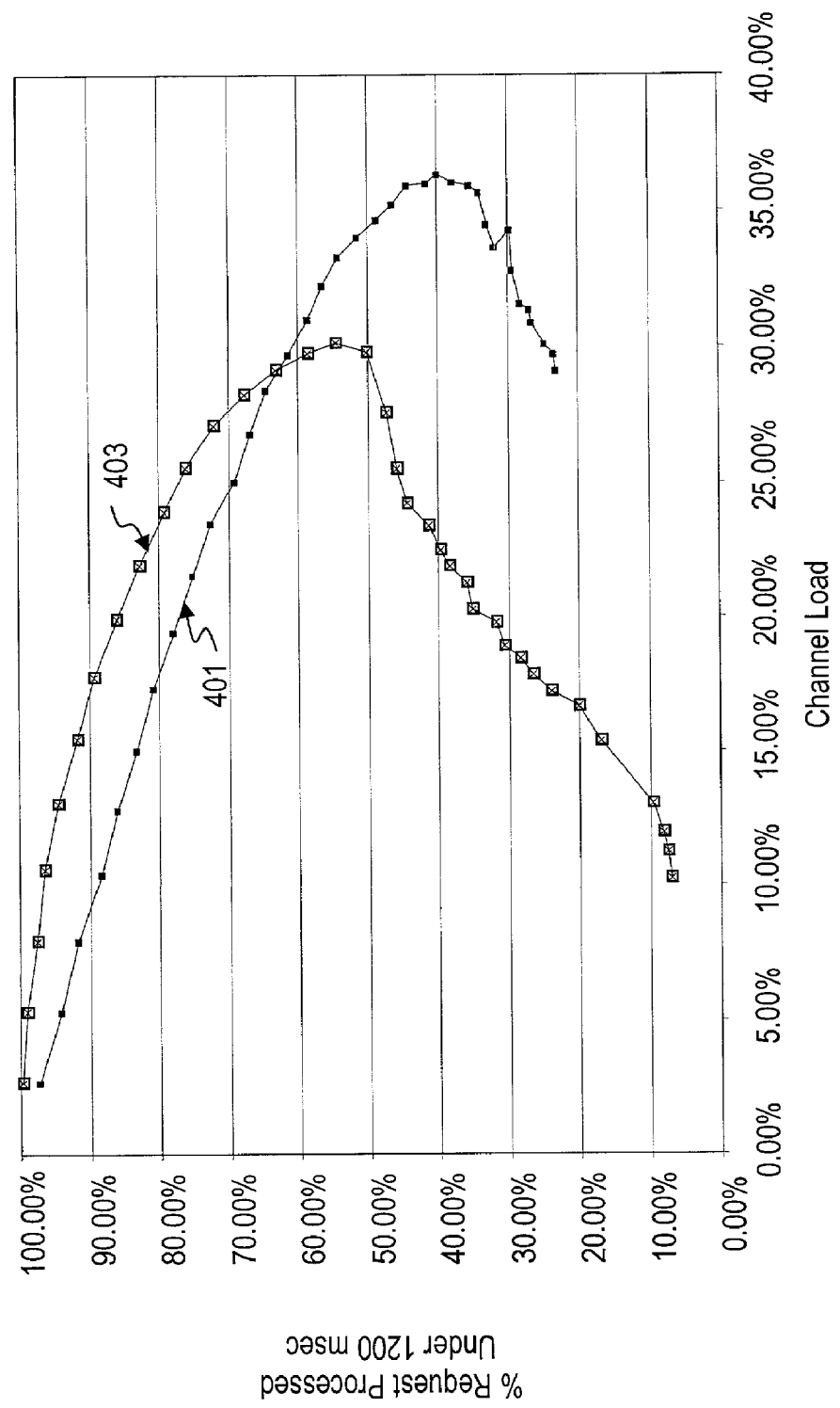
FIG. 4 is a graph showing the performance of a slotted ALOHA system versus a diversity ALOHA system.
Figure 5:
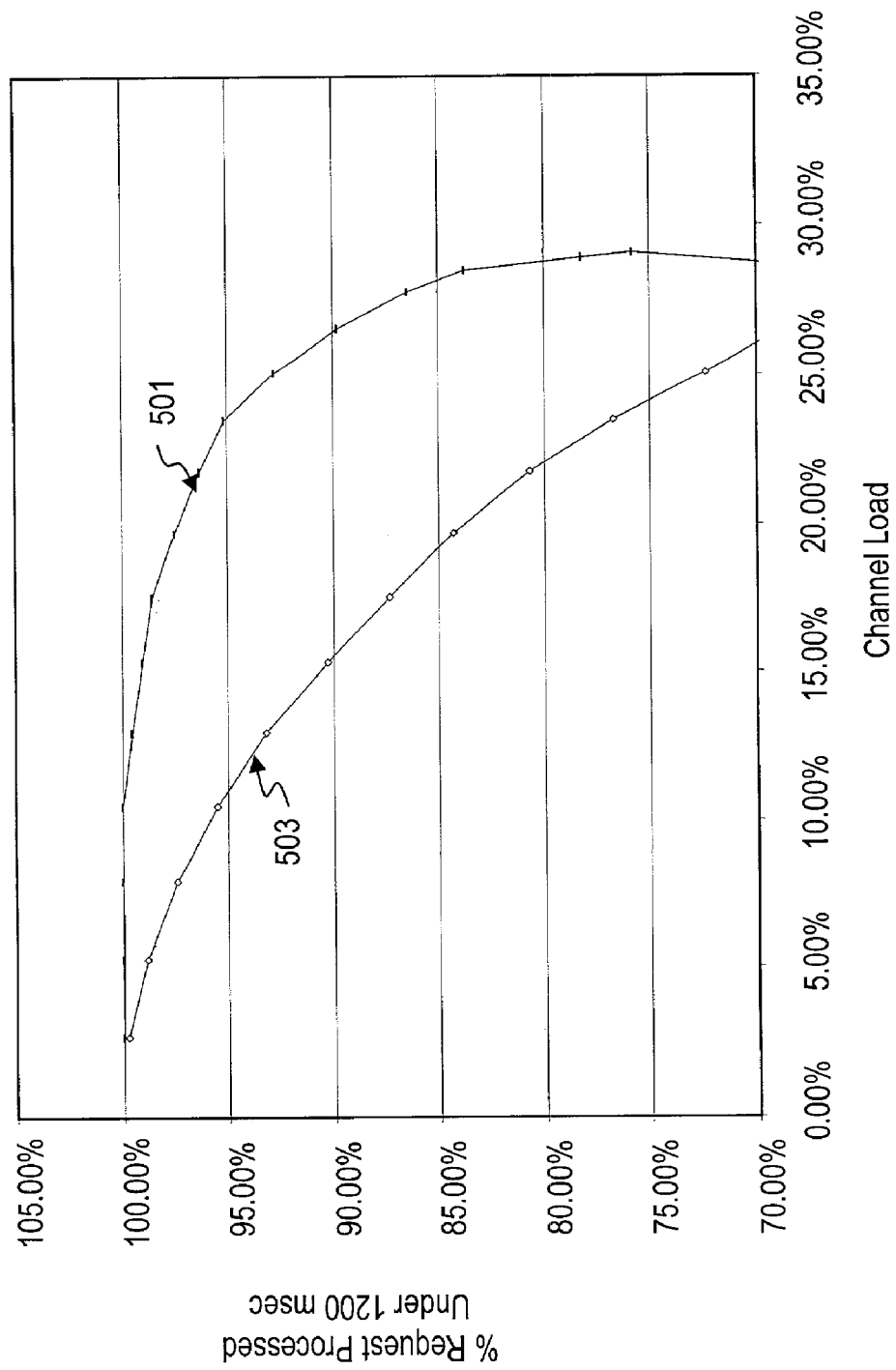
FIG. 5 is a graph showing the performance of the system of FIG. 2, wherein a Diversity ALOHA scheme provides 4 slots and 2 slots for premium service and basic service, respectively.
Figure 6:
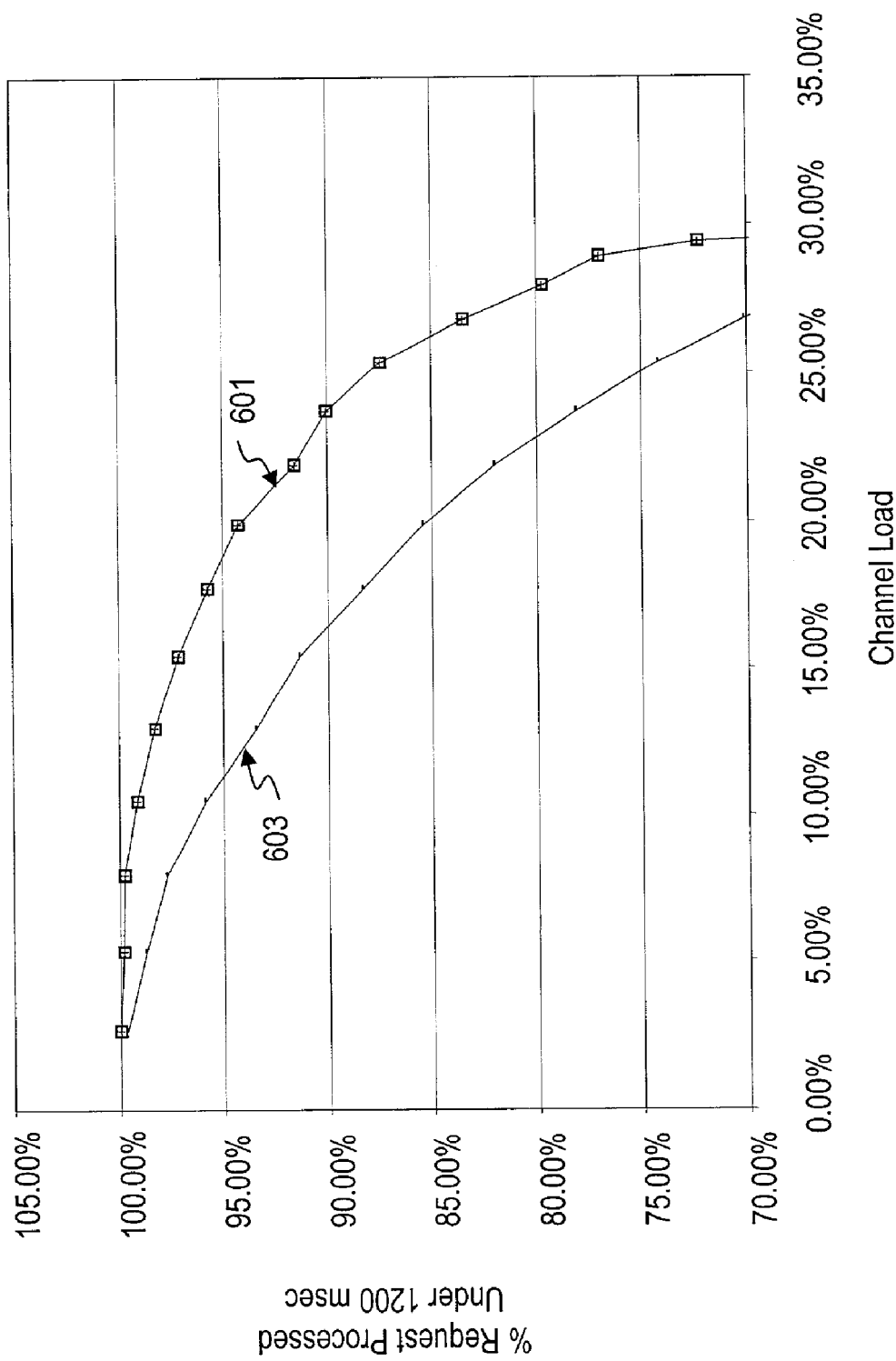
FIG. 6 is a graph showing the performance of the system of FIG. 2, wherein a Diversity ALOHA scheme provides 3 slots and 2 slots for premium service and basic service, respectively.
Figure 7:
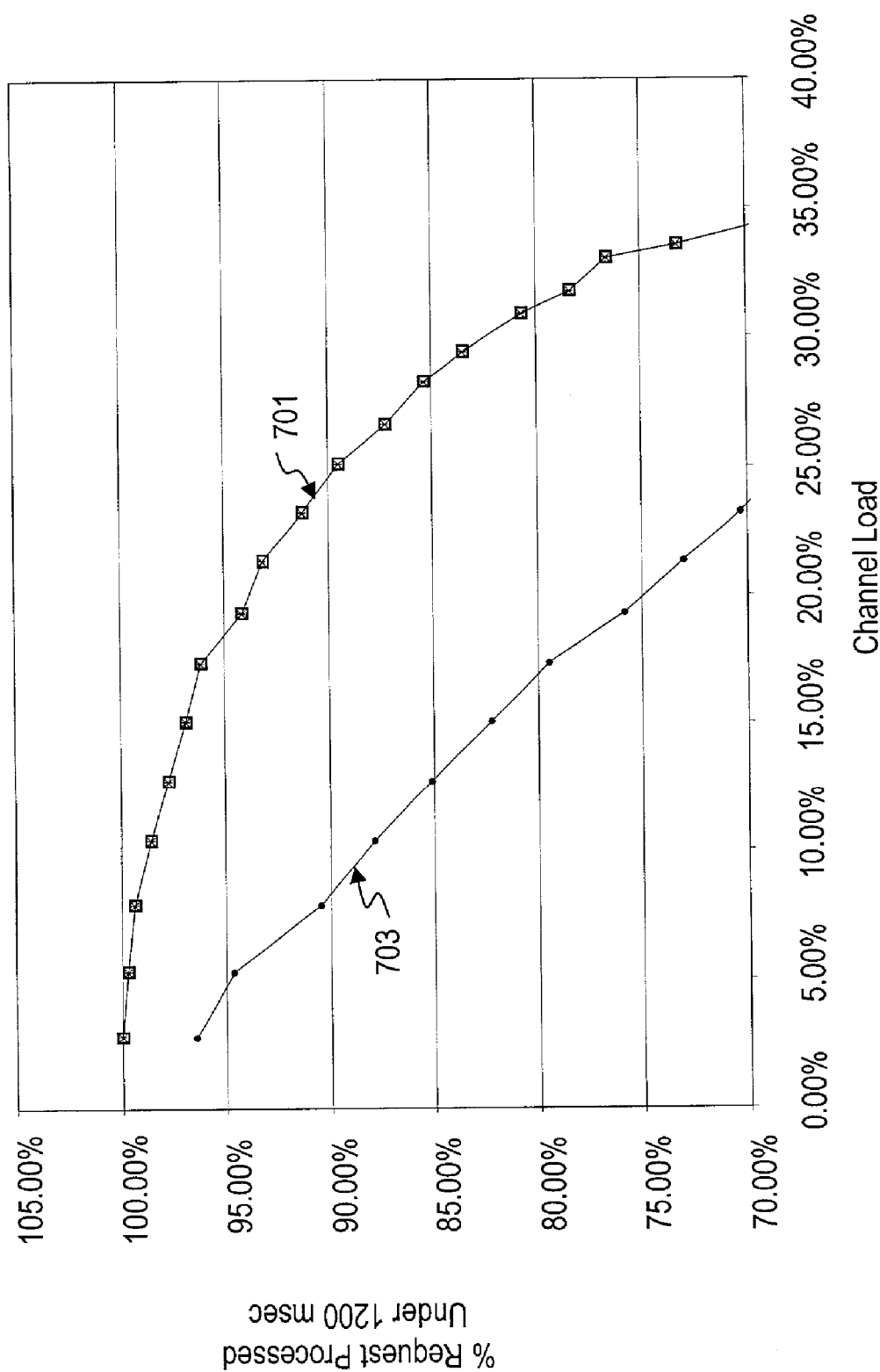
FIG. 7 is a graph showing the performance of the system of FIG. 2, wherein a Diversity ALOHA scheme provides 2 slots and 1 slot for premium service and basic service, respectively.

The effectiveness of the approach of FIG. 3 is shown in the graphs of FIGS. 5-7, which illustrate the performance characteristics of the QoS mechanisms of various embodiments of the present invention. As a baseline, the performance of a conventional slotted ALOHA system are shown in FIG. 4.

FIG. 4 is a graph showing the performance of a slotted ALOHA system versus a diversity ALOHA system. Slotted ALOHA is frequently used in satellite to carry the initial transmission of a terminal along with requests for reserved bandwidth to carry subsequent data. A traffic model captures this process by simulating a terminal that waits a random period of time, and then generates a single request. When the single request's transmission completes, the process repeats with the terminal waiting another random period of time. A simulated terminal generates a request that is to be transmitted according to a uniform random interval between 0 and 2000 milliseconds (msec) after start of the simulation or completion of the attempt to transmit the previous burst. In this simulation, a burst is assumed to be successful, unless it collides with one or more other bursts—in which case all bursts involved in the collision fail. In satellite systems, one way of evaluating a multiple access scheme is to determine the maximum efficiency the scheme can deliver and still have, for example, 95% of all transmission take place in less than 1200 msec.

Furthermore, for simplicity, a single channel is used with one ALOHA slot per msec. The round-trip time refers to the time a terminal takes to determine whether its previous transmission was successful. For this simulation, the round-trip time is assumed to be 800 ms, which models a typical VSAT satellite communications system. Additionally, the load on the channel is increased by running the simulation multiple times with an increasing number of users for each run.

The simulation shows the percentage of transmissions for which the round-trip time is less than 1200 msec as a function of ALOHA channel load for a slotted ALOHA function 401 and for a diversity 2 ALOHA function 403, that is, where a terminal sends each burst twice. Both the slotted ALOHA function 401 and the diversity ALOHA function 403 have the characteristic that when overloaded the actual amount of traffic carried falls off; this is seen as the functions 401, 403 curve, "circling back". FIG. 4 illustrates that diversity ALOHA 403 provides more transactions under the 1200 msec response time threshold when the channel is not overloaded. Accordingly, the diversity ALOHA scheme provides a higher capacity for a given percentage of transmissions that must meet a round-trip delay (e.g., 1200 msec).

FIG. 5 is a graph showing the performance of the system of FIG. 2, wherein a Diversity ALOHA scheme provides 4 slots and 2 slots for premium service and basic service, respectively. By way of example, two grades of service quality levels are provided in this simulation: basic and premium. It is assumed that 90% of the terminals serve basic users, and 10% are premium terminals. MAXTRIES is set to 10 and SELECT RANGE is set to 100 slots.

For an individual request, the key performance measurements, in an exemplary embodiment, include whether the request was successfully carried within the MAX TRIES, round-trip delay, and whether the Round-Trip Delay was under a specified threshold (e.g., 1200 ms threshold). The Round-Trip Delay is measured in terms of the number of milliseconds from when the request was generated until it is known by the sender to be successfully transmitted. This corresponds to the round-trip delay seen by an actual request/response transaction when there is zero server delay.

These individual request performance measurements are totaled to produce the following metrics for each simulation run: Channel Load, Basic Average Delay, Premium Average Delay, Basic Under-Threshold Percentage, and Premium Under-Threshold Percentage. The Channel Load can be computed from the total number of Success Requests divided by the total number of ALOHA slots. The Basic Average Delay is the average delay from all of the Success requests from basic terminals. The Premium Average Delay is the average delay from all of the Success requests from premium Terminals. The Basic Under-Threshold Percentage is the percentage of basic terminal requests, which were received under the 1200 ms threshold. The Premium Under-Threshold Percentage is the percentage of premium terminal requests, which were received under the 1200 ms threshold.

FIGS. 5-7 summarize the results of simulations comparing the response time characteristics of premium users with basic users with the following Premium/Basic diversity combinations: 4/2, 3/2, 2/1. This simulation was performed where load was provided by increasing the number of terminals in the channel and having 10% of the terminals receive the premium service. Table 1 below enumerates the configuration parameters for the simulation:

TABLE 1

| Parameter | Value |
| --- | --- |
| ALOHA slots per second | 1000 |
| Round-trip Time | 800 milliseconds |
| SELECT RANGE | 100 |
| MAXTRIES | 10 |
| Simulation Run Time | 200 sec |
| Response Time Threshold | 1200 msec |

For the simulation, a terminal generates a block of data for transmission according to a uniform random period between 1 and 2000 milliseconds after either the start of the simulation or from the completion of the previous transaction. As indicated by Table 1, the terminal selects a slot at random over a range of 100 slots.

The simulation results of FIGS. 5-7 are generally applicable even when the details of the base slotted ALOHA channel vary from those of the simulation. The results of ALOHA simulations are not particularly sensitive to the traffic model provided the duty cycle of an individual terminal is relatively small. Also, the simulations are not sensitive to whether a single TDMA channel is used or multiple FDMA/TDMA channels. Further, the simulations are not sensitive to the retransmission backoff algorithm or the random selection of the burst to be used when a transmission is needed.

FIGS. 5-7 clearly show that the premium terminal is offered, at moderate loading, a significant premium in terms of the percentage of bursts arriving under the response time threshold. For example, the system with 4/2 diversity (as seen in FIG. 5) has a function 501 corresponding to the premium terminal and a function 503 corresponding to the basic terminal. In FIG. 5, at a 15% load, the 99% of the premium terminal's transactions complete under the threshold, while only 90% of the basic terminal's transactions complete under the threshold. More dramatically, at a load of 23.5%, 95% of a premium terminal's transaction complete under the threshold compared to only 76% of the basic terminal's transactions. Similar behavior is exhibited by the graphs of FIGS. 6 and 7, in which functions 601, 701 correspond to the premium service level, and functions 603, 703 are associated with the basic service level.

Based on the results of FIGS. 5-7, it is noted that the 2/1 system performs best when the maximum channel load exceeds 30%; otherwise, the 4/2 system may be preferable. The 3/2 may be desirable when the fraction of premium terminals exceeds 10%.

Thus, the present invention, according to an embodiment of the present invention, overcomes the difficulties of providing variable quality of service of different users within a slotted ALOHA (or diversity ALOHA) multiple access system.

Figure 8:
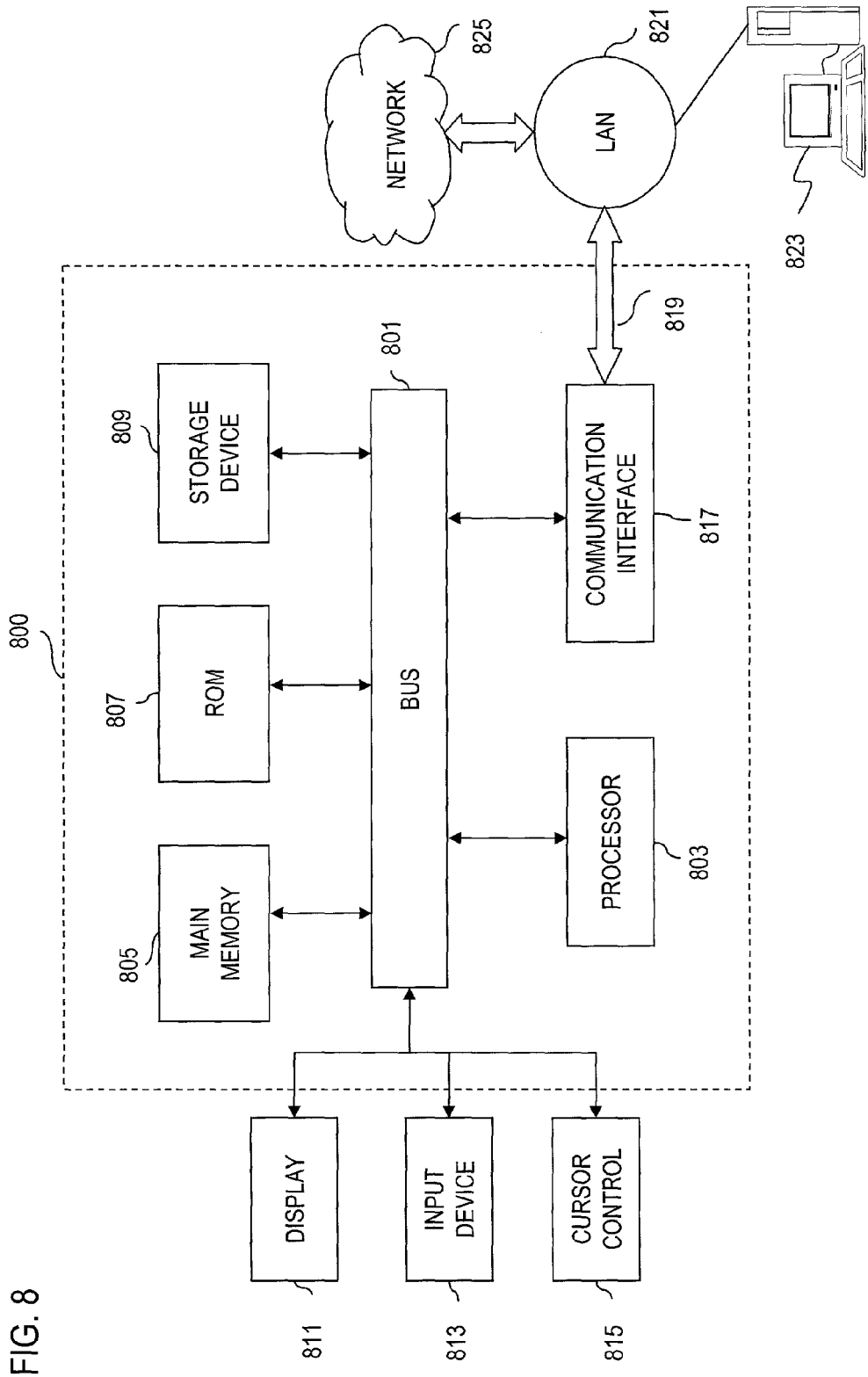
FIG. 8 is a diagram of a computer system that can support QoS services, in accordance with an embodiment of the present invention.

FIG. 8 illustrates a computer system 800 upon which an embodiment according to the present invention can be implemented. The computer system 800 includes a bus 801 or other communication mechanism for communicating information, and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions to be executed by the processor 803. The computer system 800 further includes a read only memory (ROM) 807 or other static storage device coupled to the bus 801 for storing static information and instructions for the processor 803. A storage device 809, such as a magnetic disk or optical disk, is additionally coupled to the bus 801 for storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is cursor control 815, such as a mouse, a trackball, or cursor direction keys for communicating direction information and command selections to the processor 803 and for controlling cursor movement on the display 811.

According to one embodiment of the invention, the process of FIGS. 3A-3C is provided by the computer system 800 in response to the processor 803 executing an arrangement of instructions contained in main memory 805. Such instructions can be read into main memory 805 from another computer-readable medium, such as the storage device 809.

Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, or a telephone modem to provide a data communication connection to a corresponding type of telephone line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by service provider. The local network 821 and network 825 both use electrical, electromagnetic, or optical signals to convey information and instructions. The signals through the various networks and the signals on network link 819 and through communication interface 817, which communicate digital data with computer system 800, are exemplary forms of carrier waves bearing the information and instructions.

The computer system 800 can send messages and receive data, including program code, through the network(s), network link 819, and communication interface 817. In the Internet example, a server (not shown) might transmit requested code belonging to an application program for implementing an embodiment of the present invention through the network 825, local network 821 and communication interface 817. The processor 804 may execute the transmitted code while being received and/or store the code in storage device 89, or other non-volatile storage for later execution. In this manner, computer system 800 may obtain application code in the form of a carrier wave.

The term "computer-readable medium" as used herein refers to any medium that participates in providing instructions to the processor 804 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, an approach is provided performing a contention scheme that supports differentiated quality of service levels. Under one embodiment of the present invention, terminals communicate according to a diversity ALOHA protocol, in which quality of service levels correspond to the amount of diversity. In an exemplary embodiment, a communications system with two-levels of service (e.g., basic and premium) can specify that the basic terminals operate with a diversity of two slots (i.e., transmitting each portion of data in two different, duplicate bursts), while the premium service can specify a diversity of four slots (i.e., transmitting each portion of data in three different, duplicate bursts). Additionally, in an exemplary embodiment, the contention channel is established according to a Frequency Division Multiple Access (FDMA)/Time Division Multiple Access (TDMA) scheme for providing communication in a satellite communications system. The above arrangement advantageously provides a mechanism to support Quality-of-Service (QoS) services over a contention channel.

While the present invention has been described in connection with a number of embodiments and implementations, the present invention is not so limited but covers various obvious modifications and equivalent arrangements, which fall within the purview of the appended claims.

What is claimed is:

1. A method for providing access in a communications system, the method comprising:
   generating a plurality of bursts, wherein one of the bursts is a duplicate of another one of the bursts;
   transmitting the duplicate bursts over a contention channel according to a pre-determined quality-of-service (QoS) designation; and
   selectively including in each of the duplicate bursts information specifying order of the bursts relative to another set of duplicate bursts.

2. A method according to claim 1, wherein the transmitting step is performed according to a diversity ALOHA protocol.

3. A method according to claim 2, wherein the QoS designation includes a first level of service and a second level of service, the first level of service specifying a greater number of transmissions of the duplicate bursts than the second level of service.

4. A method according to claim 3, wherein the first level of service specifies one of four slots and three slots, and the second level of service specifies one of two slots and one slot.

5. A method according to claim 1, further comprising: including in each of the duplicate bursts information identifying corresponding data within each burst.

6. A method according to claim 5, wherein the identifying information in the including step specifies identifier information of a source terminal.

7. A method according to claim 1, wherein the order information in the including step specifies a modulo N sequence number.

8. A method according to claim 1, wherein the communications system includes a satellite network supporting communication among a plurality of terminals and a hub station, each of the plurality of terminals being configured to transmit over the contention channel.

9. A method according to claim 1, wherein the contention channel is established according to a Frequency Division Multiple Access (FDMA)/Time Division Multiple Access (TDMA) scheme.

10. A network device for providing access in a communications system, the network device comprising:
logic configured to determine a service level associated with transmission of a burst; and
a transceiver configured to transmit multiple copies of the burst over a contention channel according to the service level,
wherein each of the bursts includes information specifying order of the bursts relative to another set of bursts.

11. A network device according to claim 10, wherein the bursts are transmitted according to a diversity ALOHA protocol.

12. A network device according to claim 11, wherein the service level is selected from a plurality of service levels, one of the service levels specifying at least one of a greater number of transmissions of the bursts than another one of the service levels.

13. A network device according to claim 12, wherein the one service level specifies one of four slots and three slots, and the other service level specifies one of two slots and one slot.

14. A network device according to claim 10, wherein each of the bursts includes information identifying corresponding data within each of the bursts.

15. A network device according to claim 14, wherein the identifying information specifies identifier information of the network device.

16. A network device according to claim 10 wherein the order information specifies a modulo N sequence number.

17. A network device according to claim 10, wherein the communications system includes a satellite network.

18. A network device according to claim 10, wherein the contention channel is established according to a Frequency Division Multiple Access (FDMA)/Time Division Multiple Access (TDMA) scheme.

19. A system for providing access in a communications system, the system comprising:
means for generating a plurality of bursts, wherein one of the bursts is a duplicate of another one of the bursts; and
means for transmitting the duplicate bursts over a contention channel according to a pre-determined quality-of-service (QoS) designation,
wherein each of the duplicate bursts includes information specifying order of the duplicate bursts relative to another set of duplicate bursts.

20. A system according to claim 19, wherein the duplicate bursts are transmitted according to a diversity ALOHA protocol.

21. A system according to claim 20, wherein the QoS designation includes a first level of service and a second level of service, the first level of service specifying a greater number of transmissions of the duplicate bursts than the second level of service.

22. A system according to claim 21, wherein the first level of service specifies one of four slots and three slots, and the second level of service specifies one of two slots and one slot.

23. A system according to claim 19, wherein each of the duplicate bursts includes information identifying corresponding data within each of the duplicate bursts.

24. A system according to claim 23, wherein the identifying information specifies identifier information of the system.

25. A system according to claim 19, wherein the order information specifies a modulo N sequence number.

26. A system according to claim 19, wherein the communications system includes a satellite network.

27. A system according to claim 19, wherein the contention channel is established according to a Frequency Division Multiple Access (FDMA)/Time Division Multiple Access (TDMA) scheme.

28. A computer-readable medium carrying one or more sequences of one or more instructions for providing access in a communications system, when executed by one or more processors, cause the one or more processors to perform the steps of:
generating a plurality of bursts, wherein one of the bursts is a duplicate of another one of the bursts;
transmitting the duplicate bursts over a contention channel according to a pre-determined quality-of-service (QoS) designation; and
selectively including in each of the duplicate bursts information specifying order of the bursts relative to another set of duplicate bursts.

29. A computer-readable medium according to claim 28, wherein the transmitting step is performed according to a diversity ALOHA protocol.

30. A computer-readable medium according to claim 29, wherein the QoS designation includes a first level of service and a second level of service, the first level of service specifying a greater number of transmissions of the duplicate bursts than the second level of service.

31. A computer-readable medium according to claim 30, wherein the first level of service specifies one of four slots and three slots, and the second level of service specifies one of two slots and one slot.

32. A computer-readable medium according to claim 28, wherein the one or more processors further perform the step of:
including in each of the duplicate bursts information identifying corresponding data within each burst.

33. A computer-readable medium according to claim 32, wherein the identifying information in the including step specifies identifier information of a source terminal.

34. A computer-readable medium according to claim 28, wherein the order information in the including step specifies a modulo N sequence number.

35. A computer-readable medium according to claim 28, wherein the communications system includes a satellite network supporting communication among a plurality of terminals and a hub station, each of the plurality of terminals being configured to transmit over the contention channel.

36. A computer-readable medium according to claim 28, wherein the contention channel is established according to a Frequency Division Multiple Access (FDMA)/Time Division Multiple Access (TDMA) scheme.

37. A method for providing access to a contention channel for a plurality of terminals in a communications system, the method comprising:
  specifying a plurality of service levels for the plurality of terminals; and
  executing a communication protocol to provide the contention channel, wherein one of the plurality of terminals concurrently transmits a plurality of bursts according to the corresponding service level, and one of the bursts is a duplicate of another one of the bursts,
  wherein each of the bursts includes information specifying order of the bursts relative to another set of bursts.

38. A method according to claim 37, wherein the communication protocol in the executing step is a diversity ALOHA protocol.

39. A method according to claim 38, wherein one of the service levels specifies at least one of a greater number of transmissions of the bursts than another one of the service levels.

40. A method according to claim 39, wherein the first level of service specifies one of four slots and three slots, and the second level of service specifies one of two slots and one slot.

41. A method according to claim 37, wherein each of the bursts includes information identifying corresponding data within each of the bursts.

42. A method according to claim 41, wherein the identifying information specifies identifier information of the one terminal.

43. A method according to claim 37, wherein the order information specifies a modulo N sequence number.

44. A method according to claim 37, wherein the communications system includes a satellite network.

45. A method according to claim 37, wherein the contention channel is established according to a Frequency Division Multiple Access (FDMA)/Time Division Multiple Access (TDMA) scheme.

46. A computer-readable medium carrying one or more sequences of one or more instructions for providing access to a contention channel for a plurality of terminals in a communications system, when executed by one or more processors, cause the one or more processors to perform the steps of:
  specifying a plurality of service levels for the plurality of terminals; and
  executing a communication protocol to provide the contention channel, wherein one of the plurality of terminals concurrently transmits a plurality of bursts according to the corresponding service level, and one of the bursts is a duplicate of another one of the bursts,
  wherein each of the bursts includes information specifying order of the bursts relative to another set of bursts.

47. A computer-readable medium according to claim 46, wherein the communication protocol in the executing step is a diversity ALOHA protocol.

48. A computer-readable medium according to claim 47, wherein one of the service levels specifies a greater number of transmissions of the bursts than another one of the service levels.

49. A computer-readable medium according to claim 48, wherein the first level of service specifies one of four slots and three slots, and the second level of service specifies one of two slots and one slot.

50. A computer-readable medium according to claim 46, wherein each of the bursts includes information identifying corresponding data within each of the bursts.

51. A computer-readable medium according to claim 50, wherein the identifying information specifies identifier information of the one terminal.

52. A computer-readable medium according to claim 46, wherein the order information specifies a modulo N sequence number.

53. A computer-readable medium according to claim 46, wherein the communications system includes a satellite network.

54. A computer-readable medium according to claim 46, wherein the contention channel is established according to a Frequency Division Multiple Access (FDMA)/Time Division Multiple Access (TDMA) scheme.

55. A method for communicating over a shared medium, the method comprising: receiving one or more bursts over a contention channel of the shared medium from a
  terminal, wherein the bursts are duplicates, the quantity of bursts being dependent on a pre-determined quality-of-service (QoS) designation associated with the terminal; and selectively discarding all but one of the bursts,
  wherein each of the duplicate bursts in the receiving step includes information specifying order of the bursts relative to another set of duplicate bursts.

56. A method according to claim 55, wherein the contention channel is established according to a diversity ALOHA protocol.

57. A method according to claim 56, wherein the QoS designation includes a first level of service and a second level of service, the first level of service specifying a greater number of transmissions of the duplicate bursts than the second level of service.

58. A method according to claim 57, wherein the first level of service specifies one of four slots and three slots, and the second level of service specifies one of two slots and one slot.

59. A method according to claim 55, wherein each of the duplicate bursts in the receiving step includes information identifying corresponding data within each burst.

60. A method according to claim 59, wherein the identifying information specifies identifier information of a source terminal.

61. A method according to claim 55, wherein the order information specifies a modulo N sequence number.

62. A method according to claim 55, wherein the contention channel is established according to a Frequency Division Multiple Access (FDMA)/Time Division Multiple Access (TDMA) scheme.

63. A computer-readable medium carrying one or more sequences of one or more instructions for communicating over a shared medium, when executed by one or more processors, cause the one or more processors to perform the steps of:

receiving one or more bursts over a contention channel of the shared medium from a terminal, wherein the bursts are duplicates, the quantity of bursts being dependent on a pre-determined quality-of-service (QoS) designation associated with the terminal; and selectively discarding all but one of the bursts, wherein each of the duplicate bursts in the receiving step includes information specifying order of the bursts relative to another set of duplicate bursts.

64. A computer-readable medium according to claim 63, wherein the contention channel is established according to a diversity ALOHA protocol.

65. A computer-readable medium according to claim 64, wherein the QoS designation includes a first level of service and a second level of service, the first level of service specifying a greater number of transmissions of the duplicate bursts than the second level of service.

66. A computer-readable medium according to claim 65, wherein the first level of service specifies one of four slots and three slots, and the second level of service specifies one of two slots and one slot.

67. A computer-readable medium according to claim 63, wherein each of the duplicate bursts in the receiving step includes information identifying corresponding data within each burst.

68. A computer-readable medium according to claim 67, wherein the identifying information specifies identifier information of a source terminal.

69. A computer-readable medium according to claim 63, wherein the order information specifies a modulo N sequence number.

70. A computer-readable medium according to claim 63, wherein the contention channel is established according to a Frequency Division Multiple Access (FDMA)/Time Division Multiple Access (TDMA) scheme.

* * * * *